Sept. 10, 1963
W. KOHLHAGEN
3,103,393
LUBRICATED AND VENTED SHAFT BEARINGS
FOR SMALLER MOTORS AND THE LIKE
Filed April 24, 1961
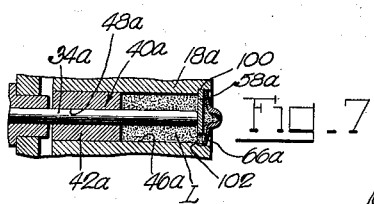
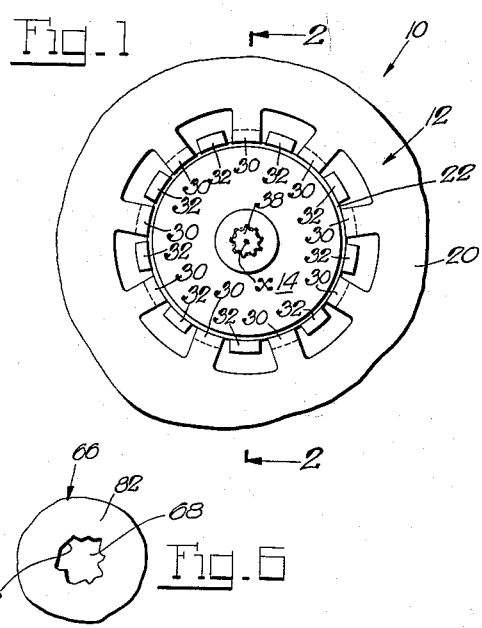
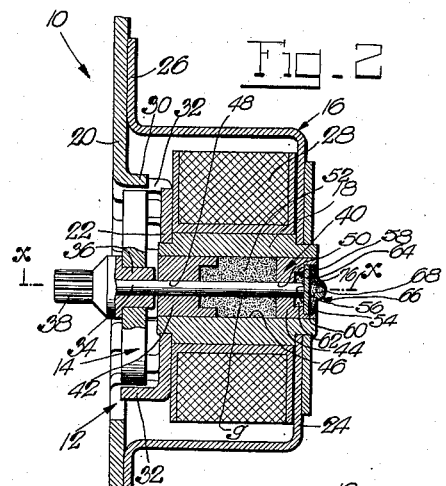
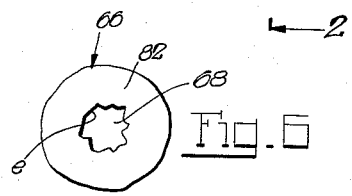
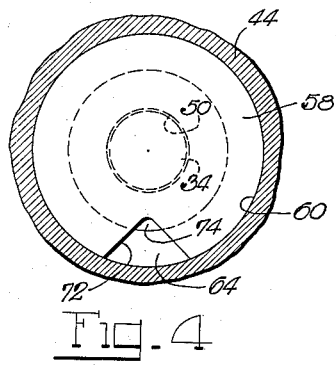
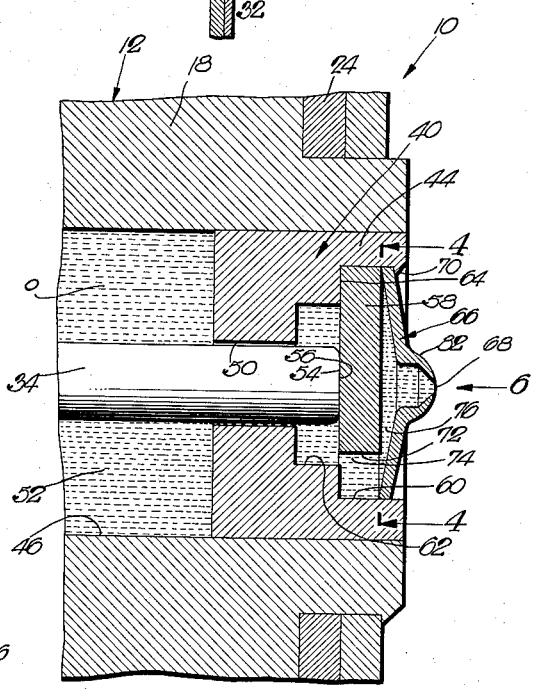
INVENTOR.
Walter Kohlhagen
BY
Attorney United States Patent Office 3,103,393
Patented Sept. 10, 1963

3,103,393
LUBRICATED AND VENTED SHAFT BEARINGS
FOR SMALLER MOTORS AND THE LIKE
Walter Kohlhagen, Elgin, Ill., assignor to Amphenol-Borg Electronics Corporation, Delavan, Wis., a corporation of Delaware
Filed Apr. 24, 1961, Ser. No. 104,933
12 Claims. (Cl. 308—121)

This invention relates to motor lubrication in general, and to lubricated and vented shaft bearings for smaller motors and the like in particular.

The present invention is concerned especially, though not exclusively, with synchronous motors the rotor shafts of which receive their sole bearing support on one side of their rotors. The bearings for the rotor shafts are customarily arranged in these motors in the usual center cores thereof which are surrounded by the field coils and form part of the magnetic field structures connecting the field poles of opposite instantaneous polarities of the motors. Bearings of this type are usually interrupted by an interposed lubricant reservoir through which the rotor shafts extend and from which they draw lubricant into their bearings by capillary action, with the ends of the bearings remote from the rotors on the shafts being closed and serving frequently as thrust bearings for the latter. Some of these bearings with their lubricant supplies are sealed from the outside once they receive their rotor shafts, while others are provided with vents.

While sealed bearings of this type are generally satisfactory in point of providing lifetime lubrication for their rotor shafts, they do not lend themselves to ready loading with lubricant and assembly with their shafts. Thus, to introduce into a sealed bearing a full supply of lubricant through the relatively narrow open end thereof in the only practical way is to force the lubricant under pressure into the bearing, which requires prior evacuation of air from the latter. Accordingly, loading a sealed bearing with lubricant in this fashion involves considerably more expense and time than is compatible with efficient low-cost mass production of the motor, and the loading operation is also quite messy. Moreover, final assembly of the rotor shaft with the loaded bearing is a most unproductive task, considering the exceedingly slow pace at which lubricant leakage from the bearing past the forced shaft will give way to the entry of the latter.

Bearings of this type which are provided with vents do not present the aforementioned difficulties of sealed bearings insofar as their loading with lubricant and assembly with their rotor shafts are concerned, but they have some shortcomings of their own. Thus, the vents are customarily provided in special plugs by drilling them, and these plugs are usually threaded in the closed bearing ends, entailing considerable cost of the plugs themselves and the added cost of tapping the bearings. Furthermore, the vents thus drilled into these plugs could be much smaller and yet permit rapid escape of the air from the bearings as they are quickly loaded with lubricant from the open ends thereof and equally rapid escape of excessive lubricant therefrom as the rotor shafts are quickly inserted therein, and most importantly, they are far too large to avoid ready lubricant leakage therethrough due to atmospheric pressure differentials inside and outside the bearings as caused by atmospheric temperature changes as well as by unavoidable heating and cooling of the field coils of the motors. In fact, leakage from this cause of lubricant from the bearings may well leave the latter after a comparatively short time with an insufficient lubricant supply for adequate lubrication of the rotor shafts therein. Yet, there is no remedy for this ready lubricant leakage through these vents, for the drills used in their formation are of the absolutely smallest sizes which lend themselves to the task without having to resort to the tools and skills of jewelers which is, of course, unthinkable for reasons of cost.

It is the primary aim and object of the present invention to provide for a rotor shaft of a synchronous motor a bearing of this type which, from the overall viewpoint of cost, lasting lubrication and ease of loading it with lubricant as well as finally assembling a rotor shaft therewith, is vastly superior to the aforementioned prior sealed and vented bearings of this type.

It is another object of the present invention to provide for a rotor shaft of a synchronous motor a bearing of this type which has all the aforementioned advantages, but none of the disadvantages, of the prior bearings of this type.

It is a further object of the present invention to provide for a rotor shaft of a synchronous motor a bearing of this type which is vented sufficiently to permit its quick loading with lubricant and equally quick assembly with its rotor shaft, but is vented insufficiently to permit any significant leakage of lubricant therefrom under any and all operating conditions.

Another object of the present invention is to provide for a rotor shaft of a synchronous motor a bearing of this type the vent of which, in order to be of the aforementioned sufficiency and insufficiency to permit quick loading of the bearing with lubricant and equally quick assembly with its rotor shaft on the one hand and rendering the bearing leakproof in operation on the other hand, is of a size much smaller than could be achieved by ordinary drilling or punching, by providing the vent in a plate metal part of the bearing which readily lends itself to cold working in a punch and die operation in the first place, and by forming the vent in this metal part by a slight rupture of the plate metal thereof in the second place.

A further object of the present invention is to provide for a rotor shaft of a synchronous motor a bearing of this type of which the aforementioned vent-forming plate metal part is conveniently blanked from sheet metal stock in the simple form of a disc which may even in the same operation be formed with its vent, thus not only making for minimum cost of this vent part, but also for its ready fitting reception in, and hence closure thereat of, an enlarged end recess in the bearing and its securement therein by simple staking.

It is another object of the present invention to devise a method of forming the vents in the aforementioned plate metal parts, according to which a part is backed with one side on a die with a portion thereof within its peripheral confines overlying a die recess which tapers depthwise to a point, and forming this portion of the part into a protrusion on the latter of nipple-like shape with a minute rupture at its tip, by driving into this portion of the part from the other side a pointed punch to a depth at which the same reaches the die solely with its point at the point of the die recess. The formation of the vents in this fashion is thus achieved in an exceedingly simple operation which readily lends itself to their highly efficient and low-cost mass production, with the vents in these parts being but minute ruptures in the plate metal of the latter. Also, since the edges of these ruptured vents are quite thin, the latter lend themselves to advantageous ready permanent cross-sectional distortion into still smaller size or even substantial closure, if desired, by a mere quick and fairly light tap thereagainst with a suitable tool such as a small hammer, which will in no wise disturb the preset location of the rotor shaft in the bearing.

It is a further object of the present invention to provide for a rotor shaft of a synchronous motor a bearing of this type which also has for the shaft a separate and highly efficient end thrust bearing with a lubricant supply for its lifetime lubrication, by interposing in the aforementioned enlarged end recess in the bearing between the thrust end of the shaft and the aforementioned closing vent disc therein a fitting thrust washer having a peripheral recess to permit unimpeded passage of air and lubricant to the vent on loading the bearing with lubricant and inserting the rotor shaft therein.

Another object of the present invention is to provide for a rotor shaft of a synchronous motor a bearing of this type of which the aforementioned thrust washer is seated with a peripheral margin on an annular shoulder in the end recess in the bearing and the vent disc is with a peripheral margin thereof seated on that of the thrust washer, thereby accurately locating the thrust washer in the bearing for proper axial coordination of the rotor on the shaft therein with the field poles of the motor in the first place, and permitting the aforementioned tapping of the vent into still smaller size or closure without disturbing the accurate location of the thrust washer in the bearing in the second place.

A further object of the present invention is to provide for a rotor shaft of a synchronous motor a bearing of this type of which the aforementioned thrust washer with its peripheral recess is advantageously blanked from any suitable sheet material and, hence, is of uniform thickness throughout, and the closing disc is in its extent from its periphery to its nipple-like vent formation frustoconical, thereby assuring ample space between the thrust washer and disc through which air and lubricant will pass unimpededly from the bearing to the vent on loading the bearing with lubricant and inserting the rotor shaft therein.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary top view of a motor with a featured rotor shaft bearing embodying the present invention;

FIG. 2 is a section through the motor taken substantially on the line 2—2 of FIG. 1;

FIG. 3 is an enlarged fragmentary section through a part of the motor with its featured bearing;

FIG. 4 is a fragmentary section taken on the line 4—4 of FIG. 3;

FIG. 5 shows an intermediate step in the formation of a prominent element of the featured bearing in accordance with a method which is part of the present invention;

FIG. 6 is a greatly enlarged, fragmentary end view of the featured bearing as seen in the direction of the arrow 6 in FIG. 3; and FIG. 7 is a fragmentary section through a modified bearing of a motor.

Referring to the drawings, and more particularly to FIGS. 1 to 3 thereof, the reference numeral 10 designates a synchronous motor having the usual field 12 and a permanent-magnet rotor 14. The field 12 comprises, in the present instance, a cup 16, a center core 18 and outer and inner field plates 20 and 22, of which the core 18 extends from the botom 24 of the cup inwardly of the latter and the outer and inner field plates 20 and 22 are secured in any suitable manner to a top flange 26 on the cup and to the inner end of the core 18, respectively. Received in the cup 16 and surrounding the center core 18 is the usual field coil 28. The outer and inner field plates 20 and 22 are provided with sets of inner and outer field poles 30 and 32, respectively, which are arranged circularly about the rotor axis $x$ of the motor, with successive poles of one set alternating with successive poles of the other set in conventional manner, and with the poles of both sets having, an energization of the field coil 28, instantaneous opposite polarities which change in phase with the A.C. supplied to the field coil.

The rotor 14 is mounted on a shaft 34, presently through intermediation of the shank 36 of an output pinion 38 which is also carried by the shaft 34. The rotor 14 has permanently magnetized pole faces on its periphery which on energization of the field coil 28 cooperate with the field poles 30, 32 in compelling the rotor to step in phase with the alternation of the current supplied to the motor. The motor described so far is entirely conventional and forms no part of the present invention except insofar as it enters into combination therewith.

The present invention features a lubricated bearing 40 for the rotor shaft 34. In its general form, the bearing 40 comprises a body having a through-passage with a longitudinal axis of which a length extending to one end thereof is a bearing aperture and an adjoining lenth thereof serves as a lubricant reservoir, and a closure at the other end of the passage having a vent. In the exemplary form shown, the body of the bearing 40 is formed by the center core 18, and by a bearing insert 42, and in this instance also another bearing insert 44, in a central bore 46 in the core 18. The bearing inserts 42 and 44 are conveniently pressfitted in the bore 46 in the core 18, and are provided with aligned bearing apertures 48 and 50 for the rotor shaft 34, with the bore 46 intermediate the bearing inserts 42, 44 serving as a reservoir 52 for a supply of lubricant, presently grease $g$ in FIG. 2 and oil $o$ in FIG. 3 to demonstrate the suitability of either type of lubricant for the bearing. The bore 46 in the center core 18 and the bearing apertures 48 and 50 in the bearing inserts have a common axis which is coincident with the rotor axis $x$. The exemplary bearing 40 is also of combined journal and thrust type, and to this end further provides for the end 54 of the rotor shaft 34 a bearing surface 56 which in the present instance is formed by a separate thrust washer 58. Moreover, the thrust bearing 56 has its own lubricant supply. To this end, the bearing insert 44 has in its rear face stepped recesses 60 and 62 with an intermediate annular shoulder 64, and the thrust washer 58 is fittedly received in the larger recess 60 and seated on the annular shoulder 64, with the other, smaller recess 62 serving as a lubricant reservoir for the thrust bearing. The open end of the recess 60 is closed by a seal 66 which provides the vent 68 of the bearing 40. With the core 18 being of magnetic material, the bearing inserts 42, 44 are preferably of non-magnetic material to shield the steel rotor shaft 34 from the field flux. Thus, the bearing inserts 42, 44 may advantageously be of bronze. The thrust washer 58 may be of any suitable material, such as nylon, for example. The end seal 66 is preferably in the form of a disc which is fittedly received in the recess 60 in the bearing insert 44 and conveniently staked therein at a few places, as at 70 (FIG. 3), with the end seal resting against the thrust washer 58 and retaining the latter seated on the annular shoulder 64.

The present motor 10 may be fully assembled and its bearing 40 charged with lubricant, with the last step in the assembly being the insertion of the rotor unit with its shaft 34 into the bearing 40. Thus, all the parts of the bearing 40, including the end seal 66, are advantageously assembled before the bearing is charged with lubricant. The parts themselves of the exemplary bearing are exceedingly simple and their assembly is equally simple. In this connection, the center core 18 and the bearing inserts 42, 44 may be cut from rod stock and finished with a few simple machine operations while easily holding the bore 64 in the core and the bearing apertures 48 and 50 in the respective bearing inserts concentric, and the thrust washer 58 and end seal 66 are conveniently blanked from sheet stock. Insofar as the assembly of these parts is concerned, there is nothing critical about pressfitting the bearing inserts 42, 44 in the bore 46 of the center core 18, it being quite easy to hold the rear insert 44 in its axial location in the core 18 within permissible tolerances at which the thrust washer 58 will hold the rotor 14 through its shaft 34 in proper axial coordination with the field poles 30 and 32. Also, placing the thrust washer 58 and the end seal 66 in the rear insert 44 and staking the end seal to the insert is devoid of any critical aspects.

After the bearing 40 is assembled, it may quickly be charged with forced lubricant through the bearing aperture 48 in the front insert 42, with the displaced air readily escaping at the other end of the bearing through the vent 68. To the end of providing for ready escape of the air from the bearing through the vent 68, the thrust washer 58 is at 72 peripherally notched to a depth sufficient to provide a passage 74, therethrough (FIGS. 3 and 4), and the end seal 66 rests with a narrow peripheral margin on the thrust washer 58 and for the rest tapers away from the latter to form therewith an unimpeded passage 76 to the vent 68. After the bearing 40 is thus quickly charged with lubricant, the rotor shaft 34 may as quickly be forced into the bearing from the front end thereof, with the excess lubricant displaced by the entering shaft readily escaping from the bearing through the vent 68.

The gist of the bearing 40 lies in its vent 68 which is of such small cross-sectional area that the bearing is to all practical intents and purposes leakproof under any and all operating conditions and will assuredly provide entirely adequate lubrication for the shaft 34 for the full life of the motor, yet will permit quick charging of the bearing with lubricant and equally quick insertion of the shaft therein as mentioned hereinbefore. To achieve these important objectives, the bearing is particularly adapted for the shafts of relatively small motors or the like, for there are obvious limits to the size of the bearing and shaft at which the former may quickly be charged with lubricant and the latter as quickly inserted therein with a vent of sufficiently small size to render the bearing leakproof under any and all operating conditions. Accordingly, the vent 68 must be minute in any event in order to render the bearing leakproof under any and all operating conditions, and must in fact be much smaller than could be achieved by drilling or punching a hole without prohibitive cost. Therefore, in order to obtain such a minute vent in the end seal 66 at reasonable cost, the vent is formed in the end seal by a small rupture therein in accordance with a method which constitutes an important aspect of the present invention. Thus, the end seal 66 is of a material which readily lends itself to cold-working, preferably plate metal such as sheet steel, for example. As already mentioned, the end seal 66 may initially be blanked as a flat disc from sheet metal stock. Assuming this to be the case, the vent is formed in the blanked disc in accordance with the present invention, by backing the disc with one side on a die with a portion thereof within its peripheral confines overlying a die recess which tapers depthwise to a point; and forming this disc portion into a protrusion on the disc of nipple-like shape with a minute rupture at its tip, by driving into this disc portion from the other side a pointed punch to a depth at which the same reaches the die solely with its point at the point of the die recess. This method is demonstrated in FIG. 5 in which the blanked seal disc 66 is initially backed on a die 80 with a portion 82 of the disc within the peripheral confines of the latter overlying a die recess 84 which depthwise tapers to a point $p$. Next a punch 86 with a point $p'$ is driven into the disc portion 82 to a depth at which it reaches the die solely with its point $p'$ at the point $p$ of the die recess 84, thereby displacing the plate metal of the disc portion 82 in the die recess 84 into a protrusion on the rest of the disc of nipple-like shape having a peripheral wall of a thickness decreasing substantially throughout the protrusion to the tip thereof and a rupture 68 at the tip. Also, in thus forming the nipple-like formation 82 on the end seal 66, the peripheral wall of this formation converges to the rupture 68 at the tip. Since the exemplary end seal 66 is tapered to its nipple-like formation 82 as described, the same may be thus tapered in the same die 80 by being forced by a punch 88 against the similarly tapered surface 90 of the die 80 preferably just before the punch 86 is driven into the disc portion 82. Of course, it is fully within the purview of the present invention, and it may well be preferred to blank the seal disc 66 from sheet metal stock and form it into the finished end seal with its nipple-like protrusion 82 and vent 68, in one and the same punch and die operation.

The penetration of the punch 86 into the disc portion 82 to a depth at which it meets the die 80 solely with its tip $p'$ at the point $p$ of the die recess 84 (FIG. 5) leaves the nipple-like protrusion on the disc with a rupture at its tip which is minute in any event and the edge $e$ of which is ragged and of random outline as shown greatly enlarged in FIG. 6. In order to obtain a clearer understanding of the minute size of the ruptured vent 68, it is well to explain that the size of the exemplary motor shown in FIG. 2 is twice the size of an actual motor incorporating the bearing 40, and the parts of the motor shown in FIGS. 3, 4 and 5 are ten times the size of the same parts of this actual motor, with the vent 68 shown in FIG. 6 being even fifty times the size of the vent in the actual motor and corresponding in actual cross-sectional area to a round hole of approximately six-thousands of an inch in diameter.

To be pointed at $p'$, the punch 86 must, of course, be tapered over an endlength thereof. Owing to the fact that the die recess 84 also tapers depthwise to the point $p$, the plate metal of the end seal at the rupture 68, as caused by the meeting of the points $p'$ and $p$ of the punch 86 and die recess 84, is very thin in any event, and is preferably so edge-thin as to form thereat advantageously a sharp ragged edge of random outline (FIG. 6. This is achieved by selecting the tapers of the punch 86 and die recess 84 so that, generally, the taper of the latter is not overly larger than that of the punch. In the present example, the die recess 84 is part-spherical and is at its point $p$ of sufficient depth to compel a short length of the cylindrical shank 92 of the punch to penetrate into the disc portion 82 (FIG. 5), thereby permitting the taper of the pointed end of the punch to be sufficiently large to force rapid reduction of the wall thickness of the plate metal thereat to a thin edge at the rupture 68, and also drawing the disc portion 82 to a depth at which increasing tensile stresses therein will lead to ready rupture of the formed nipple-like protrusion on the disc at its tip without having to drive the point of the punch with any substantial, dulling, force against the point of the die recess. The large taper of the punch 86 is further significant in that the same forms in the nipple-like protrusion on the disc a passage to the rupture 68 which is of non-capillary dimension substantially to this rupture (FIG. 3). Accordingly, no lubricant will by capillary action be held in this passage to interfere with the ready breathing of the bearing despite the very minute rupture 68.

Given by way of example only, and not by way of limitation, vents thus formed in the described exemplary punch and die operation in end seals for a large number of the aforementioned actual motors have varied from about six-thousands of an inch to about fourteen-thousands of an inch in diameter of comparable round holes. Accordingly, these particular vents, which perform entirely satisfactory in all respects in motors with bearings and shafts of the aforementioned actual sizes, are highly practical and entirely satisfactory for bearings and shafts of sizes within relatively wide limits of other small motors or the like, with these particular vents being comparable in cross-sectional area to a round hole of a diameter in a range of ten-thousands of an inch plus or minus several thousands of an inch. Of course, and as already mentioned, the size range just given of these particular vents, while certainly one highly practical range for many bearing applications in smaller motors and the like, is by no means the only practical size range of vents which may be formed according to the present invention.

Being acquainted with the exemplary size range of the particular vents 68, this brings sharply to mind the gross impracticability of drilling or punching comparable holes in even as thin a metal disc as the end seal 66 is. At that, the end seal 66 in the aforementioned exemplary motor of actual size is about ten-thousands of an inch thick in order to have adequate rigidity to seal the bearing. To drill or punch holes of a diameter anywhere between six and fourteen thousands of an inch, for example, in end seals or even only ten-thousands of an inch thickness would obviously be so prohibitive in cost as to be unthinkable for adaptation for small mass-produced motors and the like at the price they can stand.

The vents formed in accordance with the present invention are, therefore, of sizes which in their environmental smaller bearings and shafts in motors and the like permit practical quick charging of the bearings with lubricant and equally practical quick forced insertion of the shafts in the charged bearings, while they are constricted sufficiently severely to be effectively sealed off to even high atmospheric pressure differentials inside and outside the bearings and, hence, are to all practical intents and purposes leakproof for the life of the bearings. Also, since the ragged edges of these vents are not only very thin but also protruding, more or less, the vents lend themselves to ready permanent cross-sectional distortion inevitably and advantageously into still smaller size or even substantial closure, intentionally by a mere quick and fairly light tap against them with a suitable tool, or even by their being accidentally banged against some object. In either event, the tap against the vent, even if exceptionally forceful by accident, will in no wise disturb the accurate axial coordination of the rotor with the field poles, if not due to the spring-like response of the tapered end seal 66 then certainly due to the shockproof mount of the thrust washer 58 in the firmly anchored bearing insert 44.

Reference is now had to FIG. 7 which shows a somewhat modified bearing 40a for a rotor shaft 34a of a synchronous motor. Thus, the present bearing has a single insert 42a pressfitted in the forward end of the bore 46a in the center core 18a, with this insert providing the sole bearing aperture 48a for the shaft 34a and with the rest of the bore 46a in the core serving as a reservoir for lubricant L. The bore 46a is at its rear counterbored at 100 to provide an annular shoulder 102 for a thrust washer 58a, with the vented end seal 66a being placed against the thrust washer 58a and staked to the core 18a in the counterbore 100.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A journal bearing for a shaft of a small motor or the like comprising a body having a through-passage with a longitudinal axis of which a length extending to one end thereof is a bearing aperture and another length thereof is of larger cross-sectional area than said bearing aperture and serves a a lubricant reservoir; and a sealing closure at the other end of said passage including a nipple-like plate metal part having a tip and a circumferential wall of a thickness decreasing substantially throughout said part to and being edge-thin at said tip and having in said tip a minute rupture forming a vent in communication with said passage, with said wall being of sufficiently large circumference and converging to said rupture to form a passage of non-capillary dimension substantially to said rupture.

2. A journal bearing for a shaft of a small motor or the like, comprising a body having a through-passage with a longitudinal axis of which a length extending to one end thereof is a bearing aperture and an adjoining length thereof is of larger cross-sectional area than said bearing aperture and serves as a lubricant reservoir; and a sealing metal closure at the other end of said passage having a nipple-like formation with a tip and a circumferential wall of a thickness decreasing substantially throughout said formation to and being edge-thin at said tip and having in said tip a minute rupture with a ragged edge of random outline forming a vent in communication with said reservoir, with said wall being of sufficiently large circumference and converging to said rupture to form a passage of non-capillary dimension substantially to said rupture.

3. A journal bearing for a shaft of a small motor or the like, comprising a body having a through-passage with a longitudinal axis of which two spaced first lengths are aligned bearing apertures and a length intermediate and continuous with said first lengths is of larger cross-sectional area than said bearing apertures and serves as a lubricant reservoir; and a sealing metal closure at one end of said passage having a nipple-like formation with a tip and a circumferential wall of a thickness decreasing substantially throughout said formation to and being edge-thin at said tip and having in said tip a minute rupture with a ragged edge of random outline forming a vent open to said passage, with said wall being of sufficiently large circumference and converging to said rupture to form a passage of non-capillary dimension substantially to said rupture.

4. A journal bearing for a shaft of a small motor or the like, comprising a body having a through-passage with a longitudinal axis of which two spaced first lengths intermediate the ends and extending to one end, respectively, of said passage serve as lubricant reservoirs and two other lengths continuous with said first lengths and extending between the latter and to the other end of said passage, respectively, are bearing apertures of smaller cross-sectional areas than said reservoirs; and a sealing metal closure at said one end of said passage having a nipple-like formation with a tip and a circumferential wall of a thickness decreasing substantially throughout said formation to and being edge-thin at said tip and having in said tip a minute rupture with a ragged edge of random outline forming a vent open to said passage, with said wall being of sufficiently large circumference and converging to said rupture to form a passage of non-capillary dimension substantially to said rupture.

5. A combined journal and thrust bearing for a shaft of a small motor or the like, comprising a body having a through-passage with a longitudinal axis of which a length extending to one end thereof is a bearing aperture and an adjoining length thereof is of larger cross-sectional area that said bearing aperture and serves as a lubricant reservoir; a thrust bearing in said reservoir in line with said bearing aperture; and a sealing metal closure at the other end of said passage having a nipple-like formation with a tip and a circumferential wall of a thickness decreasing substantially throughout said formation to and being edge-thin at said tip and having in said tip a minute rupture with a ragged edge of random outline forming a vent in communication with said reservoir, with said wall being of sufficiently large circumference and converging to said rupture to form a passage of non-capillary dimension substantially to said rupture.

6. A combined journal and thrust bearing for a shaft of a small motor or the like, comprising a body having a through-passage with a longitudinal axis of which two spaced first lengths intermediate the ends and extending to one end, respectively, of said passage serve as intermediate and end lubricant reservoirs, respectively, and two other lengths continuous with said first lengths and extending between the latter and to the other end of said passage, respectively, are bearing apertures of smaller cross-sectional areas than said reservoirs; a thrust bearing in said end reservoir in line with said bearing apertures; and a sealing metal closure at said one end of said passage having a nipple-like formation with a tip and a wall of a thickness decreasing substantially throughout said formation to and being edge-thin at said tip and having in said tip a minute rupture with a ragged edge of random outline forming a vent open to said reservoir, with said wall being of sufficiently large circumference and converging to said rupture to form a passage of non-capillary dimension substantially to said rupture.

7. A combined journal and thrust bearing for a shaft of a small motor or the like, comprising a body having a through-passage with a longitudinal axis of which two spaced first lengths intermediate the ends and extending to one end, respectively, of said passage serve as intermediate and end lubricant reservoirs, respectively, and two other lengths continuous with said first lengths and extending between the latter and to the other end of said passage, respectively, are bearing apertures of smaller cross-sectional areas than said reservoirs; a thrust bearing in said end reservoir in line with said bearing apertures; and a sealing metal disc at said one passage end having a nipple-like formation with a tip and a wall of a thickness decreasing substantially throughout said formation to and being edge-thin at said tip and having in said tip a minute rupture with a ragged edge of random outline forming a vent open to said end reservoir, with said wall being of sufficiently large circumference and converging to said rupture to form a passage of noncapillary dimension substantially to said rupture.

8. A combined journal and thrust bearing as set forth in claim 7, in which said end reservoir is circular in cross-section and provided intermediate its length with an annular shoulder facing said one passage end, said thrust bearing is a second disc fitting in said end reservoir and resting on said shoulder and being recessed to provide communication between the parts of said end reservoir on the opposite sides of said second disc, and said sealing disc resting on said second disc and fitting and secured in said end reservoir.

9. A combined journal and thrust bearing as set forth in claim 8, in which said nipple-like formation is provided on said sealing disc centrally thereof, and said sealing disc rests on said second disc within the annular confines of said shoulder and is otherwise spaced from said second disc.

10. An end seal for a small journal bearing with a contained lubricant reservoir, comprising a disc of plate metal stock of a certain thickness having within its peripheral confines a nipple-like formation with a tip and a wall of a thickness decreasing from said certain thickness substantially throughout said formation to and being edge-thin at said tip and having in said tip a minute rupture forming a vent, with said wall being of sufficiently large circumference and converging to said rupture to form a passage of non-capillary dimension substantially to said rupture.

11. A bearing end seal as set forth in claim 10, in which said rupture has a ragged edge of random outline.

12. A bearing end seal as set forth in claim 10, in which the cross-sectional area of said rupture is substantially the same as that of a round hole of a diameter in a range of ten-thousands of an inch plus or minus several thousands of an inch.

References Cited in the file of this patent

UNITED STATES PATENTS

| | | |
|---|---|---|
| 413,740 | Stalter | Oct. 29, 1889 |
| 2,009,429 | Bijur | July 30, 1935 |
| 2,165,916 | Bissell | July 11, 1939 |
| 2,242,966 | Burkardt | May 20, 1941 |
| 2,272,029 | Benson | Feb. 3, 1942 |
| 2,586,087 | Reynolds et al. | Feb. 19, 1952 |
| 2,809,311 | Kohlhagen | Oct. 8, 1957 |
| 2,850,792 | Cobb | Sept. 9, 1958 |